United States Patent [19]

Fan et al.

[11] Patent Number: 4,485,209

[45] Date of Patent: Nov. 27, 1984

[54] PROCESS FOR PRODUCING A POLYMER WATER-IN-OIL EMULSION

[75] Inventors: You-Ling Fan, East Brunswick; George L. Brode, Bridgewater, both of N.J.

[73] Assignee: Union Carbide Corporation, Danbury, Conn.

[21] Appl. No.: 537,513

[22] Filed: Sep. 30, 1983

Related U.S. Application Data

[63] Continuation of Ser. No. 302,108, Sep. 14, 1981, abandoned.

[51] Int. Cl.$^3$ ............................................. C08K 5/01
[52] U.S. Cl. ................................. 524/801; 524/475; 523/337
[58] Field of Search ............... 523/337, 340; 524/801, 524/555, 475

[56] References Cited

U.S. PATENT DOCUMENTS

| | | | |
|---|---|---|---|
| 2,980,609 | 4/1961 | House et al. | 210/734 |
| 3,284,393 | 11/1966 | Vanderhoff et al. | |
| 3,418,237 | 12/1968 | Booth et al. | 210/907 |
| 3,578,586 | 5/1977 | Gal et al. | 210/734 |
| 3,658,771 | 4/1972 | Volk et al. | 209/5 |
| 3,691,124 | 9/1972 | Barron | 524/801 |
| 3,850,898 | 11/1974 | Ide et al. | 210/734 |
| 3,872,063 | 3/1975 | Kim | 526/240 |
| 3,926,756 | 12/1975 | Restaino | 526/240 |
| 3,996,180 | 12/1976 | Kane | 260/29.6 H |
| 3,997,492 | 12/1976 | Kane | 524/801 |
| 4,035,347 | 7/1977 | Korzenski et al. | 526/240 |
| 4,237,253 | 12/1980 | Jacquet et al. | 526/240 |
| 4,288,582 | 9/1981 | Lucas et al. | 526/240 |
| 4,309,329 | 1/1982 | Lucas et al. | 526/240 |
| 4,330,450 | 5/1982 | Lipowski et al. | 210/734 |

FOREIGN PATENT DOCUMENTS

| | | | |
|---|---|---|---|
| 2543135 | 10/1976 | Fed. Rep. of Germany | 210/727 |
| 51-18913 | 6/1976 | Japan. | |

OTHER PUBLICATIONS

ACS Articles "Fractionation of Linear Polyethylene with Gel Permeation Chromatography", pp. 99–107.

*Primary Examiner*—Paul R. Michl
*Attorney, Agent, or Firm*—Eugene C. Trautlein; Donald M. Papuga

[57] ABSTRACT

Described herein is a semi-continuous process for producing a polymer water-in-oil emulsion which process comprises:
(a) combining: (i) an aqueous solution comprising at least one water-soluble monomer and (ii) a mixture comprising a hydrophobic liquid, a hydrophobic monomer and an oil-soluble surfactant;
(b) homogenizing the mixture from (a) to form a water-in-oil emulsion;
(c) deoxygenating said homogenized water-in-oil emulsion;
(d) continually adding the homogenized water-in-oil emulsion to a reactor while adding thereto a deoxygenated initiator solution;
(e) heating the mixture from (d) under polymerization conditions so as to form a polymer water-in-oil emulsion, and
(f) recovering a polymer water-in-oil emulsion.

21 Claims, No Drawings

PROCESS FOR PRODUCING A POLYMER WATER-IN-OIL EMULSION

This application is a continuation of our prior U.S. application Ser. No. 302,108 filed Sept. 14, 1981, now abandoned.

This invention is directed to a semi-continuous process for producing a polymer water-in-oil emulsion.

Water-in-oil emulsion processes, in which a water-soluble monomer is emulsified in an oil phase and polymerized therein, are well known in the art. For example, U.S. Pat. No. 3,284,393 describes such a process wherein water-soluble monomers are polymerized to high molecular weight polymers or copolymers utilizing a water-in-oil emulsion polymerization procedure. In the polymerization process described in said patent, one or a plurality of water-soluble monomers, or an aqueous solution thereof, is emulsified in an oil phase by means of a water-in-oil emulsifier and emulsion polymerized under free radical forming conditions to form a polymeric latex in which the oil phase is the dispersion medium.

U.S. Pat. No. 3,284,393 further states that the inert hydrophobic liquid, in which a water-in-oil emulsifying agent is dissolved, is added to a reactor, and then an aqueous solution or monomer, mixed monomers, or monomers per se, is added to the oil phase until the monomer phase is emulsified in the oil phase and the polymerization is carried out. The patent states that the order of addition of reaction media ingredients is not important. The examples (other than Examples 11 and 15 which show incremential addition of aqueous monomer solutions to a reaction mixture) in the patent describe a batch reaction, i.e., a reaction in which all of the ingredients are added to the reactor and polymerization takes place.

However, it is difficult to control the compositional uniformity of the product produced by a batch reaction and also it is difficult to control the exotherm of the reaction. Difficulty in controlling uniformerly results in a broad and often erratic compositional distribution. Inability to control the exotherm of the reaction results in the formation of undesirable low molecular weight polymer, or a branched polymer, and/or agglomeration of the reaction mixture.

It has now been found that the product polymer water-in-oil emulsion produced by the semi-continuous process of this invention has high compositional uniformity. The product formed by the semi-continuous process of this invention is much more uniform than that produced by a batch process. Also, the process of this invention allows safer control of the exotherm.

Another advantage of the semi-continuous process is that the polymerization is carried out at a faster rate at the initial stage of polymerization, which results in a shorter reaction time, and a more stable water-in-oil emulsion than can be achieved by carrying out the polymerization by a batch process, in reactors having identical cooling capabilities.

By the term "semi-continuous" as used herein, is meant a process whereby the monomer is fed continuously into the reactor during the course of polymerization. In contradistinction, all the monomer emulsion is charged to a reactor at the beginning of the reaction in a batch process.

THE INVENTION

This invention is directed to a semi-continuous process for producing a polymer water-in-oil emulsion which process comprises:
(a) combining: (i) an aqueous solution comprising at least one water-soluble monomer, and (ii) a mixture comprising a hydrophobic liquid, a hydrophobic monomer and an oil-soluble surfactant;
(b) homogenizing the mixture from (a) to form a water-in-oil emulsion;
(c) deoxygenating said homogenized water-in-oil emulsion;
(d) continually adding the homogenized water-in-oil emulsion to a reactor while adding thereto a deoxygenated initiator solution;
(e) heating the mixture from (d) under polymerization conditions so as to form a polymer water-in-oil emulsion; and
(f) recovering a polymer water-in-oil emulsion.

A water-soluble surfactant is generally added to the recovered water-in-oil emulsion (f). These water-in-oil emulsions are solubilized, or inverted, in the presence of water so that the polymer readily goes into solution.

These solutions are suitable for use as flocculants for water purification, such as to facilitate the settling of particles in phosphate slimes. A process for flocculating phosphate slimes is described in U.S. patent application Ser. No. 302,141 filed in the names of M. Rosen et al, titled "Process For Flocculating Phosphate Containing Slimes" and filed on the same date as this application.

In the first step of the process of this invention, an aqueous solution containing a water-soluble monomer is combined with a mixture containing a hydrophobic liquid, a hydrophobic monomer and an oil-soluble surfactant. This combination of materials is homogenized to form a water-in-oil emulsion.

The aqueous solution contains a mixture of water soluble monomers. These monomers have a water solubility of at least 5 weight percent and include acrylamide, methacrylamide, acrylic acid, methacrylic acid, and their alkali metal salts, aminoalkyl acrylate, aminoalkyl methacrylate, dialkylaminoalkyl acrylate, benzyl sulfonates, maleic anhydride, and the like. The preferred monomers are acrylamide and acrylic acid.

If acrylic acid is used as a monomer it is reacted with a base, preferably with an equivalent amount of base, such as sodium hydroxide, so that the sodium acrylate solution has a pH of from about 5.0 to about 10.0, preferably from about 6.5 to about 8.5, depending on the type and amount of base employed. This solution is combined with another water soluble monomer, such as acrylamide, and then with water to form the aqueous phase.

The aqueous phase contains from about 45 to about 80, preferably from about 48 to about 78 weight percent of a combination of water and water soluble monomer(s).

The mixture which is combined with the aqueous solution containing the water-soluble monomer(s) contains a hydrophobic liquid, a hydrophobic monomer and an oil-soluble surfactant.

The hydrophobic liquids suitable for use herein include benzene, xylene, toluene, mineral oils, kerosenes, petroleum, and mixtures thereof. A preferred hydrophobic liquid is Isopar M (sold by Humble Oil and Refinery Company).

The hydrophobic monomer(s) which may be used in this invention include one or more of vinyl esters, such as vinyl acetate, alkyl acrylates, such as ethylacrylate, alkyl methacrylates such as methyl methacrylate, vinyl ethers such as butylvinyl ether, acrylonitrile, styrene and its derivatives, such as α-methylstyrene, N-vinyl carbazole, and the like.

The surfactants suitable for use in this invention are usually of the oil-soluble type having a Hydrophile-Lipophile Balance (HLB) value of from about 1 to about 10, preferably from about 2 to about 6. These surfactants are normally referred to as the water-in-oil type. The surfactants include fatty acid esters, such as sorbitan monolaurate, sorbitan monstearate, sorbitan monooleate, sorbitan trioleate, mono and diglycerides, such as mono and diglycerides obtained from the glycerolysis of edible fats, polyoxyethylenated fatty acid esters, such as polyoxyethylenated (4) sorbitan monosterate, polyoxyethylenated linear alcohol, such as Tergitol 15-S-3 and Tergitol 25-L-3 (both supplied by Union Carbide Corp.), polyoxyethylene sorbitol esters, such as polyoxyethylene sorbitol beeswax derivative, polyoxyethylenated alcohols such as polyoxyethylenated (2) cetyl ether, and the like.

The mixture of the aqueous phase and oil phase contains from about 20 to about 50, preferably from about 22 to about 42 weight percent of the hydrophobic liquid and hydrophobic monomer(s), based on the total weight of the composition.

The aqueous solution (i) containing the water-soluble monomer(s) is combined with the mixture containing a hydrophobic liquid, a hydrophobic monomer(s) and an oil-soluble surfactant. This mixture is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 10° to about 40° C., preferably from about 15° to 25° C. The homogenization may be carried out either continuously or in a batch process.

The emulsions so prepared have a rather narrow particle size distribution. The diamaters of the majority of the particles range from about 0.2 to about 5 microns.

The water-in-oil emulsion so produced comprises:

(a) An aqueous phase constituting from about 65 to about 80, preferably from about 48 to about 78 weight percent and containing water-soluble monomer(s) wherein the monomers constitute from the 20 to about 60, preferably from about 30 to about 50 weight percent;

(b) A hydrophobic liquid and hydrophobic monomer(s) constituting from about 15 to about 50, preferably from about 20 to about 40 weight percent;

(c) An oil-soluble surfactant constituting from about 0.1 to about 5, preferably from about 1 to about 3 weight percent.

After forming the water-in-oil emulsion, it is generally deoxygenated, by for example, subjecting the emulsion to a vacuum of from about 50 to about 500, preferably from about 100 to about 200 mm of mercury under an inert gas atmosphere at a temperature of from about 10° to about 40° C., either continuously or as a batch process.

A reactor is continuously charged with the deoxygenated water-in-oil emulsion. Preferably, an initial charge of between about 20 to about 50 percent of the deoxygenated emulsion is added to the reactor. Most preferably, the reactor is charged with an amount of deoxygenated water-in-oil emulsion so as to cover the agitator blades therein. The amount charged to the reactor depends on the geometry and size of the reactor.

Also, a catalyst or initiator useful in polymerizing ethylenically unsaturated monomers is added to the reactor. These catalysts include one or more azo and/or peroxide containing compounds, such as t-butyl hydroperoxide, t-butyl perbenzoate, benzoyl peroxide, ammonium persulfate, cumene hydroperoxide, 2,2'-azobis-(isobutyronitrile), 2,2'-azobis(2,4-dimethylveloronitrile), redox catalysts, and others known in the art. These catalysts are added to the reactor either directly or in the form of a solution, i.e., the catalyst is dissolved in a solvent, such as a hydrocarbon liquid, i.e., toluene. The catalyst solution contains from about 1 to about 10, preferably from about 3 to about 6 weight percent of the catalyst.

From about 1 to about 99, preferably from about 20 to about 60 percent of the catalyst solution is initially added to the reactor containing the water-in-oil emulsion.

The remaining water-in-oil emulsion and catalyst solution are then continually fed into the reactor.

The polymerization is carried out at a temperature of from about 30° to about 70° C., preferably from about 40° to about 55° C., most preferably from about 48° to about 52° C., for about 1 to about 10 hours, preferably from about 2 to about 6 hours. The reaction time depending on the size of the reactor and the polymerization conditions.

The polymerization is generally carried out at atmospheric pressure, although subatmospheric and superatmospheric pressures may be used. The polymerization is preferably carried out under an inert atmosphere, such as a helium, argon or nitrogen.

The polymerization reaction generates considerable heat which must be removed. Generally, the heat is dissipated by normal cooling facilities.

The polymerization reaction rate may be controlled by the introduction of small quantites of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50 parts per million is desirable. When the air is introduced intermittently, a flow rate of from about 0.01 to about 1.0, preferably from about 0.05 to about 0.5 cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may added to the reaction mass. Any organic antioxidant suitable for the inhibition of free radical reactions may be used. The antioxidant is generally dissolved in a suitable solvent. The preferred antioxidants include substituted phenols, such as Ionol, thiobisphenol, such as Santonox-R, and hydroquinone derivatives, such as the monomethyl ether of hydroquinine. The suitable solvents include toluene, benzene, xylene, diethyl ether, methyl acetate, and the like. The antioxidant is present in the solution in amounts of from about 1 to about 30, preferably from about 5 to about 10 percent.

The antioxidant solution is added to the reaction mass in amounts of from about 0.05 to about 5 parts per hundred parts of resin.

Addition of the antioxidant may be commenced either at the end of the polymerization or after the reaction mixture has been cooled to ambient temperature.

The reaction mass is generally cooled to about 25° C. and the polymer water-in-oil emulsion recovered.

The polymer water-in-oil emulsion is described in U.S. patent application Ser. No. 302,142, now U.S. Pat. No. 4,452,940 (Chu et al.) issued June 5, 1984; filed in the names of N. Chu et al, titled "Polymer Water-in-Oil-Emulsions", and filed on the same date as this application.

The polymer water-in-oil emulsion as described in said U.S. Pat. No. 4,452,940 (Chu et al.) comprises:

(a) an aqueous phase comprising from about 60 to about 80, preferably from about 68 to about 78 weight percent, and containing therein from about 30 to about 70, preferably from about 35 to about 55 weight percent of polymer and from about 30 to about 70, preferably from about 45 to about 65 weight percent of water, based on the total weight of the formulation;

(b) a hydrophobic liquid constituting from about 15 to about 39.5, preferably from about 19 to about 31 weight percent, and (c) an oil-soluble surfactant constituting from about 0.5 to about 5, preferably from about 1 to about 3 weight percent (based on the total weight of the emulsion).

The polymers produced by the process of this invention have an intrinsic viscosity of from about 2 to about 40, preferably from about 10 to about 35, and most preferably from about 18 to about 30 dl/g as measured in a one normal (N) aqueous sodium chloride solution at 25° C.

The polymers produced by the process of this invention are copolymers, terpolymers or tetrapolymers. The polymers may be anionic, cationic or nonionic.

The polymers are preferably of the following general formula:

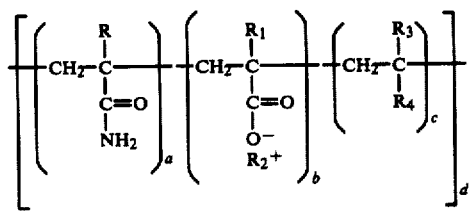

wherein R, $R_1$ and $R_3$ are independently hydrogen or methyl, $R_2^+$ is an alkali metal ion, such as $Na^+$ or $K^+$, $R_4$ is $OR_5$, where $R_5$ is an alkyl group having up to 5 carbon atoms,

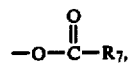

wherein $R_7$ is either methyl or ethyl,

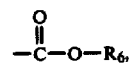

phenyl substituted phenyl, CN, or

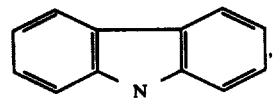

and $R_6$ is an alkyl group having up to 8 carbon atoms, wherein (a) is from 0 to about 90, preferably from about 30 to about 60 percent, (b) is from 0 to about 90, preferably from about 30 to bout 60 percent, (c) is from about 0.2 to about 20, preferably from about 1 to about 10 percent, with the proviso that (a)+(b)+(c) equal 100, and (d) is an integer of from about 1,000 to about 500,000.

Under certain conditions, the alkoxy or acyloxy groups in the polymer may be partially hydrolyzed to the corresponding alcohol group and yield and tetrapolymer of the following general formula:

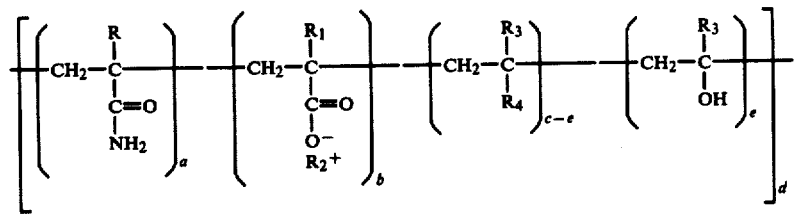

wherein R, $R_1$, $R_2^+$, $R_3$, $R_4$, a, b, c, and d are as previously defined and e is from about 0.1 to less than about 20 percent;

The preferred polymers are terpolymers of the following formula:

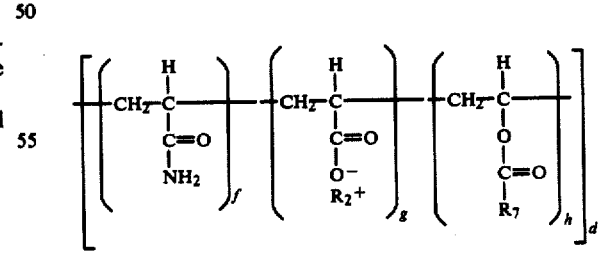

wherein $R_2^+$ is $Na^+$ or $K^+$, $R_7$ is methyl, ethyl, or butyl, and f is from about 5 to about 90, preferably from about 30 to about 60 percent, g is from about 5 to 90, preferably from about 30 to 60 percent h is from about 0.2 to about 20, with the proviso that (f)+(g)+(h) equal 100 and d is as previously defined.

The preferred tetrapolymers are of the following formula:

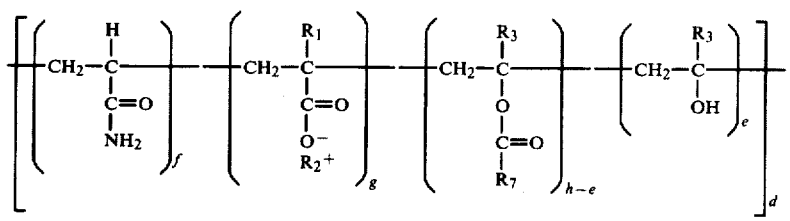

wherein $R_1$, $R_2^+$, $R_3$, $R_7$, f, g, h, d and e are as previous defined.

If desired, the polymer may be recovered by, for example, coagulation in a lrge excess of a non-solvent for the polymer, such as isopropyl alcohol. The polymer is then collected by filtration and subsequently dried.

After the water-in-oil emulsion is prepared, a water-soluble inverting surfactant may be added thereto. The surfactants which may be used include polyoxyethylene alkyl phenol, polyoxyethylene (10 mole) cetyl ether, polyoxyethylene alkyl-aryl ether, quaternary ammonium derivatives, potassium oleate, N-cetyl N-ethyl morpholinium ethosulfate, sodium lauryl sulfate, condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethylene oxide condensation products of polyhydric alcohol partial higher fatty esters, and their inner anhydrides (mannitolanhydride, called Mannitan, and sorbitol-anhydride, called Sorbitan). The preferred surfactants are ethoxylated nonyl phenols, ethoxylated nonyl phenol formaldehyde resins, and the like.

The inverting surfactant is used in amounts of from about 0.1 to about 20, preferably from about 1 to about 10 parts per one hundred parts of the polymer.

The water-in-oil emulsion containing the inverting surfactant is solubilized or inverted in the presence of water. The polymer-containing emulsion releases the polymer in the water in a very short period of time.

The solubilized polymer may then be used as a flocculant. For use as flocculant the water solution contains from about 0.001 to about 0.3, preferably from about 0.01 to about 0.1 percent of the polymer.

EXAMPLES

The following examples serve to give specific illustrations of the practice of this invention but they are not intended in any way to limit the scope of this invention.

EXAMPLE 1 preparation of monomer emulsion feed (i) Sodium acrylate solution: An acrylic acid solution containing 158.2 gm of acrylic acid and 186.94 gm of deionized water was neutralized with a freshly prepared 40 percent sodium hydroxide solution (about 229.09 gm) to a final pH of 6.5. The neturalization was carried out at a temperature not exceeding 20° C. to prevent premature polymerization from taking place.

(ii) Acrylamide solution: The solution was prepared by adding 205.69 gm of acrylamide crystals under vigorous stirring to 251.95 gm of deionized water at a temperature below 25° C. Air was present during the dissolution to inhibit polymerization.

(iii) Oil-soluble monomer and surfactant mixture: A homogenous solution was prepared by dissolving 18.92 gm of a sorbitan monooleate (Span-80 supplied by Imperial Chemical Industries) into 339.5 gm of Isopar-M while stirring. Thereafter, 21.27 gm of vinyl acetate was rapidly added and the system stirred for an additional five minutes to yield a uniform mixture.

(iv) Monomer emulsion feed: Into a warning blender, containing mixture (iii), was added, under vigorous stirring, solutions (i) and (ii). The latter was combined with 0.06 gm of ethylenediamine tetraacetic acid prior to its addition to ensure compositional uniformity of the finished monomer emulsion.

The monomer emulsion as prepared above was thoroughly deoxygenated by stirring under a vacuum for 10 minutes and subsequently breaking the vacuum with nitrogen; this procedure was repeated two more times. Thereafter, the monomer emulsion was kept at 25° C. or below under a nitrogen atmosphere until its complete addition. The storage tank was equipped with a cooling coil (jacket), a temperature measuring device, and an air-injection dip tube which can be used to stop the polymerization in case of an accidental initiation.

Initiator solution feed: This solution was prepared by dissolving 0.78 gm of 2,2'-azobis(isobutyronitrile) dissolved in 17.78 gm of toluene. The solution was purged with nitrogen before and during the course of polymerization.

Inhibitor solution: The solution was prepared by dissolving 0.78 gm of a thiobisphenol (Santonox-R supplied by Monsanto Chemical Co.) in 10 gm of toluene.

The reactor consisted of a two-liter Pyrex glass reactor equipped with a turbine agitator, two addition tunnels, a condenser, a thermometer, and a nitrogen inlet and outlet tube. An external heating/cooling bath was employed. The turbine agitator had a four-one-inch blade impeller and the blades were pitched at a 45° angle to the driving shaft.

The reactor was charged, under a nitrogen atmosphere, with 282.32 gm (20 percent) of the monomer emulsion. While the nitrogen flow continued, heating was applied to bring the reaction temperature to 55° C. Once the temperature was stabilized, 3.91 gm of the initiator solution was quickly added. Thereafter, both the monomer emulsion and the catalyst solution streams were continuously fed into the reactor at rates such that feeding was complete in about two hours. The induction time was usually very short and an exotherm may occur immediately after the initiator addition. After charging was complete, the polymerization was allowed to continue for two additional hours. During this period, sufficient cooling was provided to dissipate the heat of polymerization. The reactor temperature was maintained at 55±2° C. At the end of polymerization, the inhibitor solution was added and the reactor was allowed to cool to room temperature (about 25° C.). The product was discharged through a two-layer cheese cloth. The conversion was usually quantitative and the finished emulsion contained about 30 percent by weight of polymer. The polymer had an intrinsic viscosity of 18.4 dl/gm. as measured in a one normal aqueous sodium chloride solution. The emulsion was highly uniform and contained very fine particles which had diameters ranging from 0.2 to 2 microns.

EXAMPLE 2

Preparation of monomer emulsion feed (i) Sodium acrylate solution: An acrylic acid solution containing 124.84 gm acrylic acid and 227.86 gm of deionized water was neutralized with a freshly prepared 40 percent sodium hydroxide solution (about 173.39 gm) to a final pH of 6.5. The neutralization was carried out at temperatures not exceeding 20° C. to prevent premature polymerization from taking place.

(ii) Acrylamide solution: This solution was prepared by adding 205.93 gm of acrylamide crystals to 261.6 gm of water under vigorous stirring at temperatures below 25° C. Air was present during the dissolution to inhibit polymerization.

(iii) Oil-soluble monomer and surfactant mixture: A homogenous solution was prepared by dissolving 19.12 gm of Span-80 into 339.43 gm of Isopar-M under agitation. Thereafter, 66.6 gm of ethyl acrylate was rapidly added and the system stirred for an additional five minutes to yield a uniform mixture.

The monomer emulsion feed was prepared and deoxygenated, the initiator solution feed and inhibitor solution were prepared and the monomers polymerized all by the procedure as described in Example 1.

The product was a milky white water-in-oil emulsion. Examination by an optical microscope showed that the average diameter of the suspended particles was about 0.2 to 2 microns. The polymer had an intrinsic viscosity of 16.4 dl/gm as measured in a one normal aqueous sodium chloride solution.

EXAMPLE 3

The procedure of Example 1 was exactly repeated except that time 2,2'-azobis(isobuytyronitrile) initiator was replaced with the same amount of 2,2-azobis(2,4-dimethyl-4-methoxyvaleronitrile (Vazo-52 supplied by E. I. du Pont de Nemours Co.)). A uniform milky white water-in-oil emulsion was produced. The average diameters of the suspended particles was measured by an optical microscope and found to be about 1.5 microns. The polymer had an intrinsic viscosity of 18.1 dl/gm as measured in a one normal aqueous sodium chloride solution.

EXAMPLE 4

The procedure of Example 1 was exactly repeated except that time 2,2'-azobis(isobutyronitrle) initiator was repeated with the same amount of 2,2-azobis(2,4-dimethyl- 4-methoxyvaleronitrile) and the polymerization was carried out at a temperature of 43° C. instead of 55° C. A uniform, milky white water-in-oil emulsion was produced. The polymer had an intrinsic viscosity of 28.6 dl/gm as measured in a one normal aqueous sodium chloride solution.

EXAMPLE 5

The procedure of Example 5 was exactly repeated except that one-half the amount of initiator was used. The polymer product had an intrinsic viscosity of 29.7 dl/gm as measured in a one normal aqueous sodium chloride solution.

EXAMPLE 6

The procedure of Example 5 was exactly repeated except that the polymerization was carried out at a temperature of 40° C. instead of 43° C. A uniform milky white water-in-oil emulsion was obtained. The polymer product had an intrinsic viscosity of 30.6 dl/gm as measured in a one normal aqueous sodium chloride solution. The suspended particles in the emulsion were found to have diameters ranging from 0.2 to 2 microns.

EXAMPLE 7

The procedure of Example 1 was exactly repeated except: (a) the sodium acrylate solution was prepared using 28.22 gm of acrylic acid and 39.2 gm of a 40 percent sodium hydroxide solution and 50 gm of water, (b) the acrylamide solution contained 47.14 gm of acrylamide, 72.75 gm of water, and 0.02 gm of ethylenediamine tetraacetic acid, and (c) the oil mixture was made from 4.4 gm of Span-80, 82 gm of Isopar-M, and 12.99 gm of vinyl acetate and (d) a mixture containing 0.2 gm of the monomethyl ether of hydoquinone, 3 gm of water, and 2.5 gm of Isopar-M was introduced at the end of polymerization to act as an inhibitor. A uniform, milky white emulsion was produced. The conversion was quantitative. The recovered polymer was found to contain 12.83 mole percent of vinyl acetate, 52.19 mole percent of acrylamide, and 34.98 mole percent of sodium acrylate. The polymer had an intrinsic viscosity of 8.61 dl/gm as measured in a one normal aqueous sodium chloride solution.

EXAMPLE 8

The procedure of Example 1 was exactly repeated except: (a) the sodium acrylate solution was prepared using 48.34 gm of acrylic acid 61.37 gm of a 40 percent sodium hydroxide solution, and 66.6 gm of water, (b) the acrylamide solution contained 62.85 gm of acrylamide, 97.15 gm of water, and 0.02 gm of ethylenediamine tetraacetic acid, (c) the oil mixture was made from 5.8 gm of Span-80, 113.3 gm of Isopar-M, and 9.5 gm of vinyl acetate and (c) a mixture containing 0.26 gm of the monomethyl ether of hydroquinone, 2.5 gm of water, and 2.5 gm of Isopar-M was introduced at the end of polymerization to act an inhibitor. A uniform, milky white emulsion was produced. The recovered polymer was found to contain 10.14 mole percent of vinyl acetate, 55.55 mole percent of acrylamide, and 35.31 mole percent of sodium acrylate. The polymer had an intrinsic viscosity of 10.67 dl/gm as measured in a one normal aqueous sodium chloride solution.

EXAMPLE 9

The procedure of Example 2 was exactly repeated except: (a) the pH of the sodium acrylate solution was 9.37 instead of 6.5, (b) the initiator solution was prepared by dissolving 0.39 gm of 2,2'-azobis(2,4-dimethyl-4-methoxyvaleronitrile) in 18.78 gm of toluene and (c) the polymerization was carried out at 40° C. A uniform product was obtained. The recovered polymer had an intrinsic viscosity of 28 dl/gm as measured in a one normal sodium aqueous chloride solution.

EXAMPLE 10

The procedure of Example 9 was exactly repeated except that the pH of the sodium acrylate solution was 6.5. A uniform product was obtained. The recovered polymer had an intrinsic viscosity of 24.6 dl/gm as measured in a one normal aqueous sodium chloride solution.

EXAMPLE 11

The procedure of Example 2 was exactly repeated except: (a) the sodium acrylate solution was adjusted to a pH of 10.67, (b) an equivalent amount of 2,2-azobis (2,4-dimethyl-4-methoxyvaleronitrile) was used insted of 2,2'-azobis(isobutyronitrile), and (c) the polymerization was carried out at a temperature of 43° C. A uniform water-in-oil emulsion was obtained. The recovered in a one normal aqueous sodium chloride solution.

EXAMPLE 12

The procedure of Example 2 was exactly repeated except: (a) an ammonium persulfate initiator ws used in addition to the 2,2'-azobis(isobutyronitrile), and (b) an aqueous solution containing 0.3 gm of ammonium persulfate and 3 gm of water was introduced to the reaction vessel one-hour after the completion of the monomer addition. A uniform water-in-oil emulsion was obtained. The recovered polymer had an intrinsic viscosity of 10.34 dl/gm as measured in a one normal aqueous sodium chloride solution.

EXAMPLE 13

The procedure of Example 12 was exactly repeated except that the 2,2'-azobis(isobutyronitrile) was replaced with an equal amount of lauroyl peroxide. A milky-white, uniform emulsion was obtained. The recovered polymer had an intrinsic viscosity of 9.86 dl/gm as measured in a one normal aqueous sodium chloride solution.

EXAMPLE 14

The procedure of Example 13 was exactly repeated except that the lauroyl peroxide was replaced with an equal amount of benzoyl peroxide. A uniform water-in-oil emulsion was obtained. The recovered polymer had an intrinsic viscosity of 9.85 dl/gm as measured in a one normal aqueous sodium chloride solution.

EXAMPLE 15

The procedure of Example 1 was exactly repeated except that the Span-80 was replaced with an equal amount of a sorbitan monostearate (Span-60 supplied by Imperial Chemical Industries). A uniform, milky white emulsion was obtained. The recovered polymer had an intrinsic viscosity of 18.1 dl/gm as measured in a one normal aqueous sodium chloride solution.

EXAMPLE 16

The procedure of Example 15 was exactly repeated except that the Span-80 was replaced with an equal amount of an 1:1 mixture of a sorbitol partial fatty esters (Atpet-100 supplied by Imperial Chemical Industries) and a sorbitan tristearate (Span-65 supplied by Imperial Chemical Industries). A uniform, milky white emulsion was obtained. The recovered polymer had an intrinsic viscosity of 17.9 dl/gm as measured in a one normal aqueous sodium chloride solution.

EXAMPLE 17

The procedure of Example 15 was exactly repeated, except that the Span-80 was replaced with an equal amount of a polyoxyethylene sorbitol beeswax derivative (G-1702 supplied by Imperial Chemical Industries). A uniform, milky white emulsion was obtained. The recovered polymer had an intrinsic viscosity of 17.6 dl/gm as measured in a one normal aqueous sodium chloride solution.

EXAMPLE 18

A portion of the product prepared in Example 1 was thoroughly mixed with a water soluble surfactant, i.e., a polyoxyethylenated nonylphenol (Tergitol NP-10 supplied by Union Carbide Corporation) to yield an emulsion containing about 1.5 percent by weight of the surfactant. This mixture can be rapidly dissolved in water with stirring. An aqueous solution containing 0.3 percent of this polymer had a typical Brookfield viscosity to about 2,400 centipose (Brookfield Viscometer Model HBT, Spindle No. 2, 10 RPM and at 25° C.).

EXAMPLE 19

A portion of the product made in Example 2 was mixed with a water soluble surfactant, i.e., a polyoxyethylenated nonylphenol (Tergitol NP 13 supplied by Union Carbide Corporation) to yield an emulsion containing about 1.5 percent by weight of the surfactant. An aqueous solution containing 1 percent by weight of this emulsion had a Brookfield viscosity of about 2,200 centipoise (as measured by the procedure in Example 18).

EXAMPLE 20

The procedure of Example 1 was exactly repeated except: (a) the acrylamide solution was prepared using a commercial 50 percent aqueous solution (Acrylamide-50 supplied by American Cyanamide) instead of the acrylamide crystals (b) and one half the amount of 2,2'-azobis (2,4-dimethyl-4-methoxyvaleronitrile) was substituted for the 2,2'-azobis(isobutyronitrile). A uniform and milky white emulsion was obtained. The recovered polymer had an intrinsic viscosity of 14.3 dl/gm as measured in a one normal aqueous sodium chloride solution.

EXAMPLE 21

The procedure of Example 1 was exactly repeated except: (a) the acrylamide solution was prepared using acrylamide-50 (described in Example 20), (b) an equal amount of 2,2'-azobis (2,4-dimethyl-4-methoxyvaleronitrile) was substituted for the 2,2'-azobis(isobutyronitrile), (c) a double amount of ethylenediamine tetraacetic acid was used, and (d) the polymerization was carried out at a temperature of 52° instead of 55° C. A fine emulsion was obtained at the end of polymerization. The recovered polymer had an intrinsic viscosity of 19.1 dl/gm as measured in a one normal aqueous sodium chloride solution. A 0.3 percent aqueous solution of this polymer had a Brookfield viscosity of 2,912 centipoise (Brookfield Viscometer Model HBT, Spindle No. 2,10 RPM at 25° C.).

EXAMPLE 22

A (vinyl acetate-sodium acrylate) copolymer water-in-oil emulsion was prepared according to the following procedures: An aqueous solution was prepared by mixing, under cooling conditions, 96.49 gm of acrylic acid, 163.75 gm of water, 130 gm of a 40 percent sodium hydroxide solution and 0.02 gm of ethylenediamine tetraacetic acid. Separately, an oil solution was prepared by mixing 5.8 gm of Span-80, 113.3 gm of Isopar-M and 6.5 gm of vinyl acetate. The two solutions were combined in a high speed waring blender to give a uniform emulsion. A catalyst solution was prepared by dissolving 0.26 gm of 2,2'-azobis(isobutyronitrile) in 3.13 ml of acetone. The monomer emulsion was then deoxygenated as described in Example 1. The polymerization was carried out in the manner as in Example 1, except that a one-liter pyrex glass reactor equipped as described in Example 1, was used. The product produced was a milky white emulsion containing about 24 percent by weight of the polymer. The polymer had an intrinsic viscosity of 4.2 dl/gm as measured in a one normal aqueous sodium chloride solution.

EXAMPLE 23

A nonionic vinyl acetate-acrylamide copolymer was prepared according to the procedure as described in Example 22, except that the aqueous solution contained 125.96 gm of acrylamide, 200.57 gm of water and 0.02 gm of ethylenediamine tetraacetic acid. The water-in-oil emulsion contained 26 percent by weight of active polymer. The polymer had an intrinsic viscosity of 3 dl/gm as measured in a one normal aqueous sodium chloride solution.

EXAMPLE 24

A cationic copolymer composed of the quaternization product of methylaminoethyl methacrylate, methyl chloride and hydroxyethyl acrylate was prepared according to the procedure as described in Example 22, except that the aqueous solution was made from 146.95 gm of the quaternization product, 332.6 gm of water and 0.02 gm of ethylenediamine tetraacetic acid. The oil phase was composed of a fine mixture of 146.93 gm of Isopar-M, 5.8 gm of Span-80, and 20 gm of hydroxyethyl acrylate. After the polymerization was completed, a fine and uniform emulsion was recovered. The polymer had an intrinsic viscosity of 6.1 dl/gm as measured in a 3 percent sodium chloride solution.

EXAMPLE 25

A cationic terpolymer composed of the quaternization product used in Example 24, acrylamide, and vinyl acetate prepared according to the procedure described in Example 22, except that the aqueoussolution was made from 35.5 gm of acrylamide, 332.6 gm of water, 0.02 gm of ethylenediamine tetraacetic acid and 138.4 gm of the quaternization product. The oil solution was made from 5.8 gm of Span-80 , 113.3 gm of Isopar-M and 5 gm of vinyl acetate. The finished water-in-oil emulsion contained about 20 percent by weight of active polymer. The polymer had an intrinsic viscosity of 6.1 dl/gm as measured in a 3 percent aqueous sodium chloride solution.

EXAMPLE 26

The procedure of Example 1 was exactly repeated with the exception that the deoxygenation of the monomer emulsion was performed by a continous process described as follows: The monomer emulsion prepared according to Example 1(iv) was pumped through a thin-film devolatilizer operating under a vacuum of 200 mm of mercury pressure and a nitrogen atmosphere. The operating conditions of the thin-film devolatilizer were adjusted such that the dissolved oxygen content in the deoxygenated monomer emulsion was reduced to below 3 ppm, preferably below 1 ppm. The reactor was charged, under a nitrogen atmosphere, with 282.32 gm (20 percent) of the deoxygenated monomer emulsion. While the nitrogen flow continued, the reaction temperature was raised to 55°. Once the temperature was stabilized, 3.91 gm of the initiator solution was added. The monomer emulsion was then added continuously through the thin-film devolatilizer into the reactor at a rate such that the addition was complete in about two hours. The rest of the initiator solution was fed simultneousy as described in Example 1. After charging was complete, the polymerization was allowed to continue for two additional hours. At the end of the polymerization, the inhibitor solution was added and the reactor was allowed to cool to room temperature (about 25° C.). A fine and uniform water-in-oil emulsion was obtained. The conversion was greater than 99 percent and the recovered polymer had an intrinsic viscosity of 19.2 dl/gm as measured in a one normal aqueous sodium chloride solution.

What is claimed is:

1. A semi-continuous process for producing an addition polymer water-in-oil emulsion, which process comprises:
   (a) combining: (i) an aqueous solution comprising at least one water soluble ethylenic monomer and (ii) a mixture comprising a hydrophobic liquid, a hydrophobic ethylenic monomer and an oil-soluble surfactant;
   (b) homogenizing the mixture from (a) to form a water-in-oil emulsion;
   (c) deoxygenating said homogenized water-in-oil emulsion;
   (d) continually adding the homogenized water-in-oil emulsion to a reactor during the course of the polymerization of the monomers while adding thereto a deoxygenated initiator solution;
   (e) heating the mixture from (d) under polymerization conditions so as to form a polymer water-in-oil emulsion, and
   (f) recovering a polymer water-in-oil emulsion.

2. A process as defined in claim 1 wherein the water soluble monomer in (a) (i) is selected from one or more of the following: acrylamide, methacrylamide, acrylic acid, methacrylic acid, and their alkali metal salts, aminoalkyl acrylate, aminoalkyl methcrylate, dialkylaminoalkyl acrylate, dialkylamino methacrylate, and their quarternized salts with dimethyl sulfate or methyl chloride, vinyl benzyl dimethyl ammonium chloride, alkali metal and ammonium salts of 2-sulfoethylacrylate, alkali metal and ammonium salts of vinyl benzyl sulfonates, and maleic anhydride and 2-acrylamido-2-methylpropane sulfonic acid.

3. A process as defined in claims 1 or 2 wherein the water soluble monomer in (a) (i) is selected from acrylamide or acrylic acid, or mixtures thereof.

4. A process as defined in claims 1 or 2 wherein the water soluble monomer in (a)(i) 1is an alkali metal salt of acrylic acid.

5. A process as defined in claim 1 wherein the aqueous solution in (a) (i) contains from about 45 to about 80 percent of a combination of water and water soluble monomer(s).

6. A process as defined in claim 1 wherein the hydrophobic monomer in (a) (ii) is selected from a vinyl ester, an alkyl acrylate, an alkyl methacrylate, vinyl ether, acrylonitrile, styrene and its derivatives, N-vinyl carbazole, an alkyl vinyl ether, and mixtures thereof.

7. A process as defined in claims 1 or 6 wherein the hydrophobic monomer is selected from vinyl acetate, ethylacrylate, butylvinyl ether, acrylonitrile, styrene, α-methylstyrene, N-vinyl carbazole, and mixtures thereof.

8. A process as defined in claim 1 wherein the hydrophobic liquid is selected from benzene, xylene, mineral oil, kerosene, petroleum oil, and mixtures thereof.

9. A process as defined in claims 1 or 7 wherein the hydrophobic liquid is Isopar M.

10. A process as defined in claim 1 wherein the oil-soluble surfactant has an HLB of from about 1 to about 10.

11. A process as defined in claim 1 wherein the mixture of (a) contains from about 15 to about 50 percent of the hydrophobic liquid and hydrophobic monomer(s).

12. A process as defined in claim 1 wherein the homogenization of (b) is carried out at a temperature of from about 10° to about 40° C.

13. A process as defined in claim 1 wherein the water-in-oil emulsion has particles whose diameters are from about 0.2 about 5 microns.

14. A process as defined in claim 1 wherein the homogenized water-in-oil emulsion is deoxygenated in step (c) by subjecting it to a vacuum and/or nitrogen sparging.

15. A process as defined in claim 1 wherein the polymerization is carried out at a temperature of from about 30° to about 70° C.

16. A process as defined in claim 1 wherein the polymerization reaction rate is controlled by the introduction of air into the reaction.

17. A process as defined in claim 1 wherein an antioxidant is added to the reaction mass after polymerization 18. A process as defined in claim 1 wherein the polymer in the water-in-oil emulsion has an intrinsic viscosity of from about 2 to about 40 dl/gm as measured in an one normal aqueous sodium chloride solution at 25° C.

19. A process as defined in claim 1 wherein the polymer is a copolymer, terpolymer or tetrapolymer.

20. A process as defined in claim 1 wherein the polymers are of the following general formula:

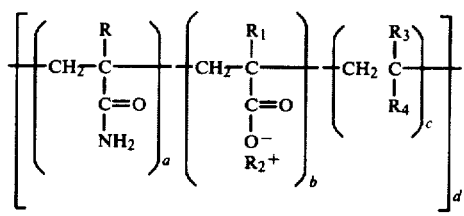

wherein R, $R_1$ and $R_3$ are independently hydrogen or methyl, $R_2{}^+$ is an alkali metal ion, $R_4$ is $OR_5$, where $R_5$ is an alkyl group having up to 5 carbon atoms,

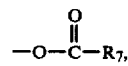

wherein $R_7$ is either methyl or ethyl,

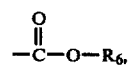

phenyl, CN, or

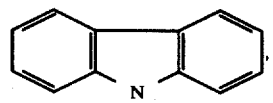

and $R_6$ is an alkyl group having up to 8 carbon atoms, and wherein (a) is from 0 to about 90, (b) is from 0 to about 90, (c) is from about 0.2 to about 20, with the proviso that (a)+(b)+(c) equal 100, and (d) is an integer of from about 1,000 to about 500,000.

21. A process as defined in claim 1 wherein the polymer is a terpolymer of the following formula:

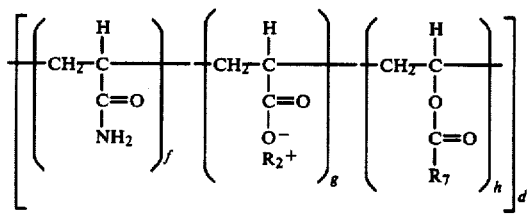

wherein $R_2{}^+$ is $Na^+$ or $K^+$, $R_7$ is methyl, ethyl, or butyl, and f is from about 5 to 90 percent, g is from about 5 to about 90, h is from about 0.2 to about 20 with the proviso that (f)+(g)+(h) equal 100 and d is an integer of from about 1000 to about 500,000.

* * * * *

UNITED STATES PATENT AND TRADEMARK OFFICE
CERTIFICATE OF CORRECTION

PATENT NO. : 4,485,209
DATED : November 27, 1984
INVENTOR(S) : Fan et al.

It is certified that error appears in the above—identified patent and that said Letters Patent is hereby corrected as shown below:

Column 7, line 16 "lrge" should read -- large --.

Column 9, lines 44 and 57 "time" should read -- the -- at each location.

Column 11, line 18 after "recovered" insert -- polymer had an intrinsic viscosity of 15.9 dl/gm as measured --.

Column 12, line 21 "centipose" should read -- centipoise --.

Column 13, line 50 "aqueoussolution" should read -- aqueous solution --.

Column 14, line 14 "simultneousy" should read -- simultaneously --.

Claim 2, line 5 "methcrylate" should read -- methacrylate --.

Claim 4, line 2 "l is" should read -- is --.

Claim 21, line 5 delete "percent".

Signed and Sealed this

Twenty-third Day of April 1985

[SEAL]

Attest:

DONALD J. QUIGG

Attesting Officer    Acting Commissioner of Patents and Trademarks